US010939143B2

United States Patent
Iyer et al.

(10) Patent No.: US 10,939,143 B2
(45) Date of Patent: Mar. 2, 2021

(54) SYSTEM AND METHOD FOR DYNAMICALLY CREATING AND INSERTING IMMERSIVE PROMOTIONAL CONTENT IN A MULTIMEDIA

(71) Applicant: Wipro Limited, Bangalore (IN)

(72) Inventors: Ganeshkumar Laxminarayanan Iyer, Chennai (IN); Arvind Sundararajan, Chennai (IN)

(73) Assignee: Wipro Limited, Bangalore (IN)

( * ) Notice: Subject to any disclaimer, the term of this patent is extended or adjusted under 35 U.S.C. 154(b) by 62 days.

(21) Appl. No.: 16/365,220

(22) Filed: Mar. 26, 2019

(65) Prior Publication Data
US 2020/0314465 A1 Oct. 1, 2020

(30) Foreign Application Priority Data
Mar. 26, 2019 (IN) .............................. 201941011789

(51) Int. Cl.
*H04N 7/10* (2006.01)
*H04N 21/234* (2011.01)
(Continued)

(52) U.S. Cl.
CPC ..... *H04N 21/23424* (2013.01); *G06F 16/483* (2019.01); *H04N 21/2402* (2013.01);
(Continued)

(58) Field of Classification Search
CPC ......... H04N 21/23424; H04N 21/4858; H04N 21/25891; H04N 21/4545; H04N 21/4542;
(Continued)

(56) References Cited

U.S. PATENT DOCUMENTS 6,100,925 A * 8/2000 Rosser ................. G01S 3/7864
348/169
10,091,556 B1 * 10/2018 Liden ............... H04N 21/44008
(Continued)

FOREIGN PATENT DOCUMENTS

WO 2018035133 A 2/2018

OTHER PUBLICATIONS

CDN Optimization for VR Streaming—The Broadcast Bridge, last retrieved from the Internet Mar. 26, 2019: <https://www.thebroadcastbridge.com/content/entry/12158/cdn-optimization-for-vr-streaming>.
(Continued)

*Primary Examiner* — Michael B. Pierorazio
(74) *Attorney, Agent, or Firm* — Finnegan, Henderson, Farabow, Garrett & Dunner, LLP (57) ABSTRACT

The present invention relates to the field of dynamic content creation and management and more particularly to dynamically create and insert immersive promotional content in a multimedia. The multimedia requested by a user is procured from a media server (105) and the one or more objects present in the multimedia is determined. The content of the multimedia is analyzed, and a decision is taken to immerse the promotional content in the multimedia based on the analysis of the multimedia. Further, a promotional content is created in real time using the components present in the asset database (106) based on the personalized user profile. The created promotional content is overlaid and blended with a at least one object from the one or more objects in the multimedia. The created promotional content and the multimedia is joined to form a composite media and is streamed to the user device.

20 Claims, 6 Drawing Sheets

(51) Int. Cl.
  *G06F 16/483* (2019.01)
  *H04N 21/24* (2011.01)
  *H04N 21/258* (2011.01)
  *H04N 21/454* (2011.01)
  *H04N 21/4545* (2011.01)
  *H04N 21/485* (2011.01)
  *H04N 21/81* (2011.01)
(52) U.S. Cl.
  CPC ... *H04N 21/25891* (2013.01); *H04N 21/4542* (2013.01); *H04N 21/4545* (2013.01); *H04N 21/4854* (2013.01); *H04N 21/4858* (2013.01); *H04N 21/812* (2013.01)
(58) Field of Classification Search
  CPC ........... H04N 21/4854; H04N 21/2402; H04N 21/812
  USPC .......................................................... 725/32
  See application file for complete search history.

(56) References Cited

U.S. PATENT DOCUMENTS

| | | | |
|---|---|---|---|
| 2012/0110616 A1* | 5/2012 | Kilar | H04N 21/25891 |
| | | | 725/32 |
| 2015/0058123 A1 | 2/2015 | Lenahan et al. | |
| 2017/0161382 A1 | 6/2017 | Ouimet et al. | |
| 2018/0063599 A1 | 3/2018 | Park et al. | |
| 2018/0152764 A1 | 5/2018 | Taylor et al. | |

OTHER PUBLICATIONS

We Are VR Ready, Virtual Reality Solutions, last retrieved from the internet Mar. 26, 2019: <http://www.winkle360.com/>.

* cited by examiner

SYSTEM AND METHOD FOR DYNAMICALLY CREATING AND INSERTING IMMERSIVE PROMOTIONAL CONTENT IN A MULTIMEDIA

This application claims the benefit of Indian Patent Application Serial No. 201941011789, filed Mar. 26, 2019, which is hereby incorporated by reference in its entirety.

FIELD

The present disclosure relates to the field of dynamic content creation and management. Particularly, but not exclusively, the present disclosure relates to a system and method for dynamically creating and inserting immersive promotional content in a multimedia.

BACKGROUND

An existing digital marketing technology known as programmatic Advertising (AD) technology encompasses an array of technologies that automate the buying, placement and optimization of television programming inventory for an AD campaign. In this process, supply-and-demand partners utilize automated systems and business rules to place ADs in electronically programming inventory and generate an AD campaign. The programmatic AD technology uses AD formats such as Video Ad Serving Template (VAST) and Video Player Ad-serving Interface Definition (VPAID) Ads. The VAST specification is a universal XML schema for serving ADs to digital video players and provides information about the type of AD to play, the time to show up the AD, duration of the AD, whether users are able to skip it and the like. The VPAID is a script that instructs a video player on the type of AD to play, the recommended length of the AD to be played, time to surface the AD on the screen, and position on the screen for placing the AD.

An issue with the existing programmatic AD technology is the obstructive nature of the promotional content blocking the user experience and causing discomfort to the user. For example, the video of the AD occupies the entire frame or display area of the screen, the banners displayed at the lower section of the multimedia content hiding portions of the multimedia. Depending on the screen resolution of a streaming device, the resolution of the AD may be chosen for example leaderboard size (728×90), skyscraper (120×600), wide skyscraper (160×600), small square (200×200), square (250×250), large rectangle (336×280), rectangle (300×250) and the like.

Another issue with the existing programmatic AD technology is the placement of promotional content is determined by splice point, manifest and Society of Cable Telecommunications Engineers (SCTE) makers. The promotional content is inserted based on the marker position and forces the video player to switch between multimedia and the promotional content.

An issue with the existing programmatic AD technology is that the promotional content is not contextual with respect to the multimedia and the user. Further, the 3-Dimensional information of the multimedia is not captured for placement of the promotional content. For example, displaying the promotional content when news about war between two countries are telecasted or telecasting about martyr of soldiers of a country. Thus, displaying the promotional content during telecast of such news would not suit with the context, emotions of the user watching the news, and also probability of affecting the brand associated with the promotional content may be high. Another scenario where displaying the promotional content having cricket players of a country when cricket team of that country is losing the match. This would affect popularity of the cricket players and associated brand value. Also, the existing programmatic AD technology does not take into account the content in the video before displaying the AD. Often the content in the video may be unmoderated for example adult, violence, gore, war, terrorism, gambling and like. Displaying the AD along with the unmoderated content may destroy the brand reputation and results in a loss of faith on the brand. Manual and Machine learning content moderations services provide moderation at the time of video upload or post the video being flagged by the user. In another similar case, programmatic ads for ephemeral content, where the content could be a short burst live or non-live content.

Further, an issue with the existing programmatic AD technology is that the promotional content displayed is pre-conceived. i.e. the promotional content is created, stored in a repository, and is slotted in the multimedia based on the schedule. The object asset is retrieved from the repository based on the schedule, stitched with the video and sent to the video player from the server or client browser.

The quality of the video and the promotional content may deteriorate due to insufficient bandwidth in the network. the existing programmatic AD technology does not provide any mechanism for upgrading the bandwidth to ensure a smooth playout of the AD. In case of a 360-degree video, the content and promotional content adaptation is done based on the field of view and bandwidth upgrade is done without rendering the whole content as done with the existing programmatic AD technology.

The information disclosed in this background of the disclosure section is only for enhancement of understanding of the general background of the invention and should not be taken as an acknowledgement or any form of suggestion that this information forms the prior art already known to a person skilled in the art.

SUMMARY

One or more shortcomings of the prior art are overcome, and additional advantages are provided through the provision of method of the present disclosure.

Additional features and advantages are realized through the techniques of the present disclosure. Other embodiments and aspects of the disclosure are described in detail herein and are considered a part of the claimed disclosure.

Disclosed herein is a method for dynamically creating and inserting immersive promotional content in a multimedia. The method includes procuring, by a content management server, the multimedia from a media server based on a user request to stream the multimedia to a user device. Further, the method includes determining one or more objects present in the multimedia. Furthermore, the method includes classifying a content present in the multimedia to decide immersion of the promotional content on at least one object from the one or more objects. Thereafter, the method includes creating, in real time, the promotional content matching a personalized user profile based on a decision of immersing the promotional content into the at least one object. Subsequently, the method includes overlaying the promotional content onto the at least one object. Finally, the method includes joining the promotional content with the multimedia to obtain composite multimedia. The composite multimedia may stream to the user device.

Further, the present disclosure includes a content management server for dynamically creating and inserting immersive promotional content in a multimedia. The content management server includes a processor and a memory communicatively coupled to the processor. The memory stores the processor-executable instructions, which, on execution, cause the processor to procure the multimedia from a media server based on a user request to stream the multimedia to a user device. Further, the processor may be configured to determine one or more objects present in the content. Furthermore, the processor may be configured to classify a content present in the multimedia to decide immersion of the promotional content on at least one object from the one or more objects. Thereafter, the processor may be configured to create, in real time, the promotional content matching a personalized user profile based on a decision of immersing the promotional content into the at least one object. Subsequently, the processor may be configured to overlay the promotional content onto the at least one object. Finally, the processor may be configured to join the promotional content with the multimedia to obtain composite multimedia. The processor may be configured to stream the composite multimedia to the user device.

Furthermore, the present disclosure includes a non-transitory computer readable medium including instructions stored thereon that when processed by at least one processor cause a device to perform procuring the multimedia from a media server (105) based on a user request to stream the multimedia to a user device (101). Further, the processor causes the device to perform determining one or more objects present in the multimedia. Furthermore, the processor causes the device to perform classifying a content present in the multimedia to decide immersion of the promotional content on at least one object from the one or more objects. Thereafter, the processor causes the device to perform creating, in real time, the promotional content matching a personalized user profile based on a decision of immersing the promotional content into the at least one object. Subsequently, the processor causes the device to perform overlaying of the promotional content onto the at least one object. Finally, the processor causes the device to perform joining of the promotional content with the multimedia to obtain composite multimedia, wherein the composite multimedia is streamed to the user device (101).

The foregoing summary is illustrative only and is not intended to be in any way limiting. In addition to the illustrative aspects, embodiments, and features described above, further aspects, embodiments, and features may become apparent by reference to the drawings and the following detailed description.

BRIEF DESCRIPTION OF THE DRAWINGS

The novel features and characteristic of the disclosure are set forth in the appended claims. The disclosure itself, however, as well as a preferred mode of use, further objectives and advantages thereof, may best be understood by reference to the following detailed description of an illustrative embodiment when read in conjunction with the accompanying drawings. The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. One or more embodiments are now described, by way of example only, with reference to the accompanying figures wherein like reference numerals represent like elements and in which:

It should be appreciated by those skilled in the art that any block diagrams herein represent conceptual views of illustrative systems embodying the principles of the present subject matter. Similarly, it may be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and may be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "includes" "comprising", "including" or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" or "includes . . . a" does not, without more constraints, preclude the existence of other elements or additional elements in the system or apparatus.

Embodiments of the present disclosure relates to a system and method for dynamically creating and inserting immersive promotional content in a multimedia. An Ambient AD or a promotional content may be an un-obstructive advertisement (AD) which may be inserted within a video content without disrupting the end user experience. This means the AD or the promotional content may not be a banner promotional content or a display promotional content that appears on top of a video as half page, full page or occupies portion of the screen. Embodiment of the disclosure proposes to display the promotional content on the content or in other words, blended with content. Further, the disclosure proposes machine learning based algorithms to recognize objects present in the multimedia and super impose the promotional content on an object matched with a database or metadata in the video. Thereafter, the present disclosure provides a system and method for implementing the advanced ambient AD model. The Ambient AD model enables rich, interactive video Ads, for a two-dimensional video or a 360-degree video, using multiple input sources (Other Input Nodes, Voice and Affective) across multiple streaming and IoT devices only if the content of the video is moderated.

In an embodiment, a model may be proposed for creating a promotional content based on the user viewing direction and field of view to render an AD, in an un-obstructive manner. In case of a two-dimensional video, where one or more cameras are used, it has been proposed in the following disclosure that advertisements be slotted within the content rather than as an overlay blocking user experience. In case of a 360-degree video, ads are slotted only in the user viewing direction and the ADs do not appear as separate banners rather are embedded or blend within the content. The promotional content getting inserted in a 3D plane may be created using various factors that include, but are not limited to, edge detection, object recognition, animation, motion timing, blending, or compositing, created in real time, overlaid and positioned contextually on top of an existing content.

Further, in an embodiment, the ambient AD model takes inputs from affective intelligence further validated by voice alerts and other input nodes, to detect the emotions of the user and choose a relevant promotional content based on the detected emotion. The advertisement (AD), in the proposed invention may be created in real time and embedded in the video content. The ambient AD model may have a repository of 3D objects which are extracted, branded, overlaid, composited and blended on the asset. The ADs created may be aligned to the viewing direction of the user and the object on which the promotional content may be embedded. Particularly, ADs on network may have intelligence to understand the video content and enable compression aligned to the user device and accordingly the Content Service Providers may charge broadcasters or Over the top players on pay per use model for network utilization. Further, the Ad may be created by choosing a 3D model from an object asset database. The object asset database may include 3D models in one or more shapes and sizes. The 3D models in the object asset database may not be skinned or colored. The AD asset may be matched to the size and shape of the at least one object in the multimedia and a pre-defined animation may be chosen from one or more animations that may be performed by the 3D model.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
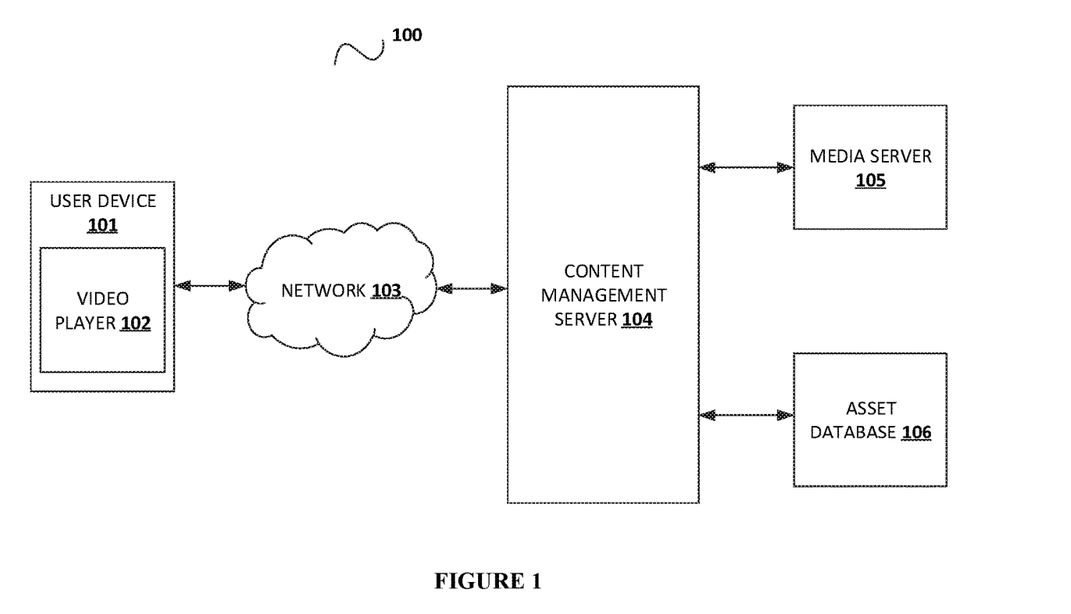
FIG. 1 shows an exemplary environment for dynamically creating and inserting immersive promotional content in a multimedia in accordance with some embodiments of the present disclosure.

FIG. 1 shows an exemplary environment for dynamically creating and inserting immersive promotional content in a multimedia in accordance with some embodiments of the present disclosure.

In an embodiment, a user device (101) may include a video player (102) capable of streaming a multimedia based on a user request. The user device (101) may be connected to the content management server (104) through a network (103). In some embodiments, the network (103) may be at least one of a wired communication network and a wireless communication network. The content management server (104) may be connected to a media server (105) and an asset database (106). The user device (101) may send the request to the content management server (104) for streaming a multimedia. The content management server (104) may procure the requested multimedia from the media server (105) and determines one or more objects present in the multimedia for immersing a promotional content. Further, the content management server (104) may analyze the content of the multimedia and based on the moderation level decided to immerse the promotional content in the multimedia. Upon deciding to immerse the promotional content in the multimedia, the content management server (104) based on the personalized user profile may retrieve the object assets. As an example, the object assets may be a 3D model of a logo, and animation effect required to create a promotional content from the asset database (106). The promotional content may be created in real time using the retrieved assets and overlaid on the multimedia by matching the retrieved object assets to the size and co-ordinates of the predefined object in the multimedia. Further, the content management server (104) may join the created promotional content and the procured multimedia form the media server (105) forming a composite media. The composite media may be streamed to the user device (101) through the network (103). The user device (101) displays the composite multimedia on the video player (102).

In an embodiment, the user device (101) may include any device capable of streaming a multimedia that may include, but is not limited to, a smartphone, internet connected television sets, desktops, tablets, entertainment systems, portable communication devices, entertainment systems, infotainment systems, wearables such as rings, bands, watches and the like, Augmented Reality and Virtual Reality devices, spectacles, head gear, Out of Home, digital signage equipment, gaming devices, and newer form of devices that may connect to internet and stream or interact with content and interact with end user.

In an embodiment, the content management server (104) may be configured in at least one of a Multi-Access Edge Computing (MEC) network, a cloud network, a remote server, or a 3D platform. Detailed explanation on the content management server (104) has been provided in subsequent description.

In an embodiment, the asset database (106) may include a brand interested to sell an advertisement (AD) and brand asset. As an example, the brand asset may be a pattern, a logo with URL to pick the brand asset, a 2D and 3D models of multiple brands in different shapes and sizes, a set of pre-defined animation which the 3D model may perform. Further, the asset database (106) may be connected to a sidechain based blockchain AD network and a zero-knowledge proof-based model for AD transaction. The sidechain may a real time model wherein an ad buyer may raise a request to buy a promotional content object asset and the system forwards the request to sellers for exhibiting their corresponding assets for sale. For example, a seller may exhibit a shirt of celebrity and the interested buyer may choose to display the promotional content on the shirt.

Figure 2:
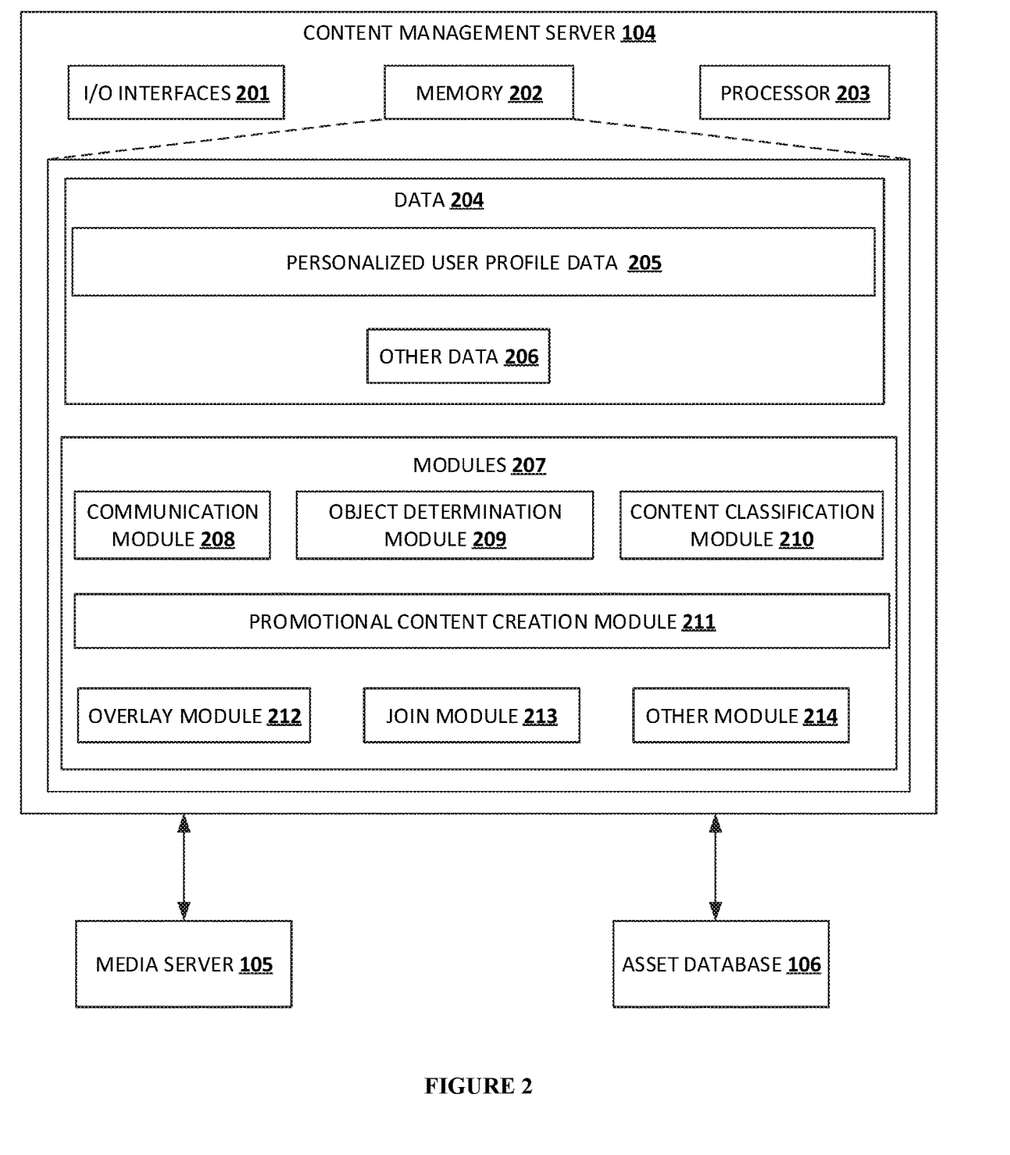
FIG. 2 shows a detailed block diagram of the content management server for dynamically creating and inserting immersive promotional content in a multimedia in accordance with some embodiments of the present disclosure.

FIG. 2 shows a detailed block diagram of the content management server for dynamically creating and inserting immersive promotional content in a multimedia in accordance with some embodiments of the present disclosure.

The content management server (104) may include Central Processing Unit ("CPU" or "processor") (203) and a memory (202) storing instructions executable by the processor (203). The processor (203) may include at least one data processor for executing program components for executing user or system-generated requests. The memory (202) may be communicatively coupled to the processor (203). The content management server (104) further includes an Input/Output (I/O) interface (201). The I/O interface (201) is coupled with the processor (203) through which an input signal or/and an output signal may be communicated. In one embodiment, the content management server (104) may receive a user request for streaming a multimedia through the I/O interface (201).

In some implementations, the content management server (104) may include data (204) and modules (207). As an example, the data (204) and modules (207) are stored in the memory (202) configured in the content management server (104) as shown in the FIG. 2. In one embodiment, the data (204) may include, for example, personalized user profile data (205) and other data (206). In the illustrated FIG. 2, modules (207) are described herein in detail.

In some embodiments, data (204) may be stored in the memory (202) in form of various data structures. Additionally, the data (204) may be organized using data models, such as relational or hierarchical data models. The other data (206) may store data, including temporary data and temporary files, generated by the modules (207) for performing the various functions of the content management server (104).

In some embodiments, the data (204) stored in the memory (202) may be processed by the modules (207) of the content management server (104). The modules (207) may be stored within the memory (202). In an example, the modules (207) communicatively coupled to the processor (203) configured in the content management server 104, may also be present outside the memory (202) as shown in FIG. 2A and implemented as hardware. As used herein, the term modules (207) may refer to an application specific integrated circuit (ASIC), a FPGA (Field Programmable Gate Array), an electronic circuit, a processor (shared, dedicated, or group) and memory that execute one or more software or firmware programs, a combinational logic circuit, and/or other suitable components that provide the described functionality. In some other embodiments, the modules (207) may be implemented using at least one of ASICs and FPGAs.

In an embodiment, the personalized user profile data (205) may include data retrieved from the user profile present on the user device (101). As an example, the data may be a facial information, extracted user's face, the personal details of the user, the information in terms of roll, pitch and yaw for the viewing direction of the multimedia, user buying habits, demographic information of the user, user responses corresponding to different types of multimedia content and the like. Further, the content management server (104) may use viola-jones or Histogram of Oriented Gradients detection to detect facial information of the user from the user images retrieved from the user device (101). The landmark estimation may be used to wrap the user images and one or more measurements generated by a neural network may be used as a feature set to identify the face of the user. A linear Support Vector Machine (SVM) classifier and random forest machine learning algorithms are used to perform the classification of the face using the feature set generated by the neural network.

In one implementation, the modules (207) may include, for example, a communication module (208), an object determination module (209), a content classification module (210), a promotional content creation module (211), an overlay module (212), a join module (213), and other module (214). It may be appreciated that such aforementioned modules may be represented as a single module or a combination of different modules.

In an embodiment, the communication module (208) may be used to communicate with the user device (101) for receiving requests regarding the multimedia, receiving the user profile information, and sending the composite multimedia. Further, the communication module (208) may be responsible for procuring the user requested multimedia form the media server (105) and extracting the promotional content assets, animation effects and the timing details from the asset database (106) for creating the promotional content.

In an embodiment, the object determination module (209) may be responsible for extracting metadata from the multimedia and identifying one or more objects present in the multimedia using an Artificial Intelligence (AI) based metadata extractor and classifier. A person skilled in the art would understand that, any other technique or tool, not mentioned explicitly, may also be used as the metadata extractor and classifier in the present disclosure. The identified one or more objects are stored in a repository or a database.

In an embodiment, the content classification module (210) may use an AI based classifiers to identify type of content based on the extracted metadata and the content of the multimedia. As an example, the multimedia may be classified into an appropriate or inappropriate type by the AI based classifiers. In one embodiment, content, for example, related to the political, religious and adult type may be classified as inappropriate content type and content for example, related to sports, news, kids, and nature may be classified as appropriate content. If the multimedia is classified as appropriate content, then a decision may be taken to immerse the promotional content. If the multimedia is classified as inappropriate, then a decision may be taken not to immerse the promotional content.

In an embodiment, the promotional content creation module (211) may be responsible for creating the promotional content in real time. The promotional content may be created matching to the personalized user profile. In one embodiment, creation of the promotional content may include detecting the promotional content object asset, retrieving corresponding 3D or 2D shape of the object asset, painting the 2D or 3D model with color of the brand and generating required animation effect of the brand from the asset database (106). Further, the promotional content may be created to match the size and shape of the at least one of object in the multimedia.

In an embodiment the created promotional content may include an advertisement, trailers of movies, and like.

In an embodiment, the overlay module (212) may be responsible for detecting edge of the at least one of object and obtain a best matching model to overlay the promotional content. The best matching model provides the details regarding the object segmentation and the chordiogram distance of the object in the multimedia. Further, a best match of the brand logos may be determined from the asset database (106) based on the resolution and the background color of the object asset. Further, the co-ordinates of the at least one of object are identified to overlay the promotional content object asset. The promotional object asset may be overlaid on the at least one of object by tracking motion of the at least one of object using a discriminative correlation filter and rendering the promotional content to a specific to the location on the multimedia. A person skilled in the art would understand that, any other techniques, not mentioned explicitly, may also be used to track motion of the at least one of object in the present disclosure.

Further, the overlay module (212) may use convolution neural networks to shape, blend and mask the promotional content 2D or 3D object asset. The object asset may be adjusted to match the size and coordinates of the at least one object by performing a shrink, rotate and flip operations on the object asset. In an embodiment, an edge detection algorithm may be used to adjust the object asset to match the size and coordinates of the at least one of object. The direction of the at least one object may be determined through one or more measurements generated by a neural network and may be used to uniquely identify the at least one object and correspondingly rotate the at least one object. The overlay may be placed on the video and in certain cases, a mask may be inserted to maintain the contrast.

In an embodiment, the join module (213) may stick the multimedia with the promotional content resulting in a composite multimedia. The join module (213) may use markers or join points in a multimedia stream to signal the start or end of the promotional content to be immersed in the multimedia. Further, an overlay filter may be used to etch the promotional content in the multimedia. The origin of the promotional content may accurately splice the multimedia at the exact timestamp signaled by the cue.

Figure 3:
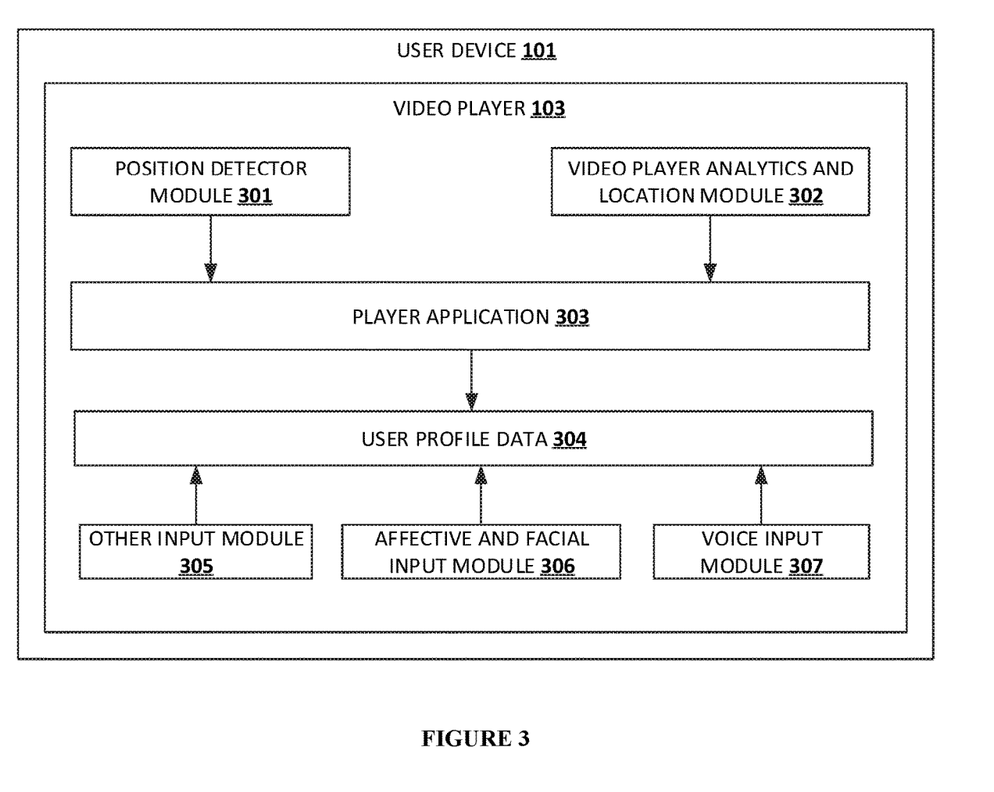
FIG. 3 shows a detailed block diagram of a user device for creating personalized user profile in accordance with some embodiment of the present disclosure.

FIG. 3 shows a detailed block diagram of a user device for creating personalized user profile in accordance with some embodiment of the present disclosure.

The user device (101) displays the composite multimedia on the screen present on the user device using a video player (102). The video player (102) may include a position detector module (301), a video player analytics and location module (302), a player application (303), a user profile data (304), other input module (305), an affective and facial input module (306), a voice input module (307).

The video player (102) may include a User Interface (UI), a media engine, and a decoder. The UI includes a video player skin, the UI logic for example a mechanism to display advertising, adjust content to streaming and IoT device specificities, authentication management and the like. The media engine may handle the functionalities relating to multimedia playback logic for example a manifest parsing, a segment retrieval, an adaptive bitrate rules and switching. The decoder performs decoding and rendering of a video segment on the screen and the DRM manager manages the decryption.

In an embodiment, the video player (102) provides a mechanism to provision additional bandwidth for the promotional content. The video player (102) calculates the required bandwidth to stream the composite multimedia. If the required bandwidth is insufficient to stream the composite multimedia the video player temporarily upgrades the composite multimedia to the AD bandwidth. The AD bandwidth may be total bandwidth required to stream the composite multimedia. Further, the video player (102) through the user device (101) requests an additional bandwidth to Policy and Charging Enforcement Function (PCEF) linked to Policy and Charging Rules Function (PCRF) or Online Charging System (OCS). In an embodiment, the video player (102) may receive a request from the content management server (104) for an additional bandwidth upon detection of insufficient bandwidth for streaming the composite multimedia to the user device (101).

The video player analytics and location module (302) may capture the Quality of Service (QoS), Quality of Experience (QoE) metrics of the video player (102) and user information for example a Time of visit of a webpage, the number of pages visited, time spent on each page of the webpages, referring site details, a location details such as Latitude and Longitude, address of the user device (101) in terms of country, state, locality and street, a type of web browser, a type of operating system (OS), a Flash version, JavaScript support, screen resolution of the user device (101), and screen colour processing ability, network location and IP address of the user device (101).

The position detector module (301) may capture user information for example user viewing angles on the video player (102) and pass control directives to instruct the video player (102) to control the position of the multimedia being displayed, orientation of the screen, and focus of multimedia's pitch, roll and yaw setting.

The other input module (305) may capture the user inputs for example an Electroencephalogram, a fingertip-based monitors, a pulse monitors and the like and stores it in the user profile data (304). Further, the other input module (305) may be used to determine the valence and arousal score. The valence score may be the degree of attraction or aversion that the user feels toward a specific object or event in the multimedia. The arousal score may be a physiological state of being awake or reactive to the events in the multimedia.

The affective and facial input module (306) may capture the affective intelligence of the user through an Artificial Intelligence (AI) based automated facial analysis performed on one or more video frames. Based on the facial action detected, a variety of parameters for example affect valence, spontaneous reactions and facial action units may be determined. The determined parameters may be used to predict the emotional and mental states of the user. Further the facial inputs captured at the video player (102) may be sent to a personalised user profile and the know your customer (KYC) details may be validated.

The voice input module (307) may capture the inputs, for example voice-based inputs, from the user received from a wired and a wireless medium connected to the user device (101) that allow users to interact with the user device (101). The voice-based inputs include the ability to move the multimedia on a 2-Dimension or a 3-Dimension plane, ability to zoom into the promotional content and control the promotional content. In some implementations standard AI algorithms along with a token parser, semantic parser, Object based databases, learning structures using neuronal networks, pattern matchers and neural network based answering systems may be used to process the voice-based inputs.

The user profile data (304) may include AI based training classifiers to recognize the face of user, the user viewing direction, the pitch and yaw settings. The combination of the information in the user profile data (304) may be sent to the personalized user data in the content management server (104).

The user profile data (304) may be used to create a personalized user profile. Further, the promotional content may be created matching the personalized user profile.

Figure 4:
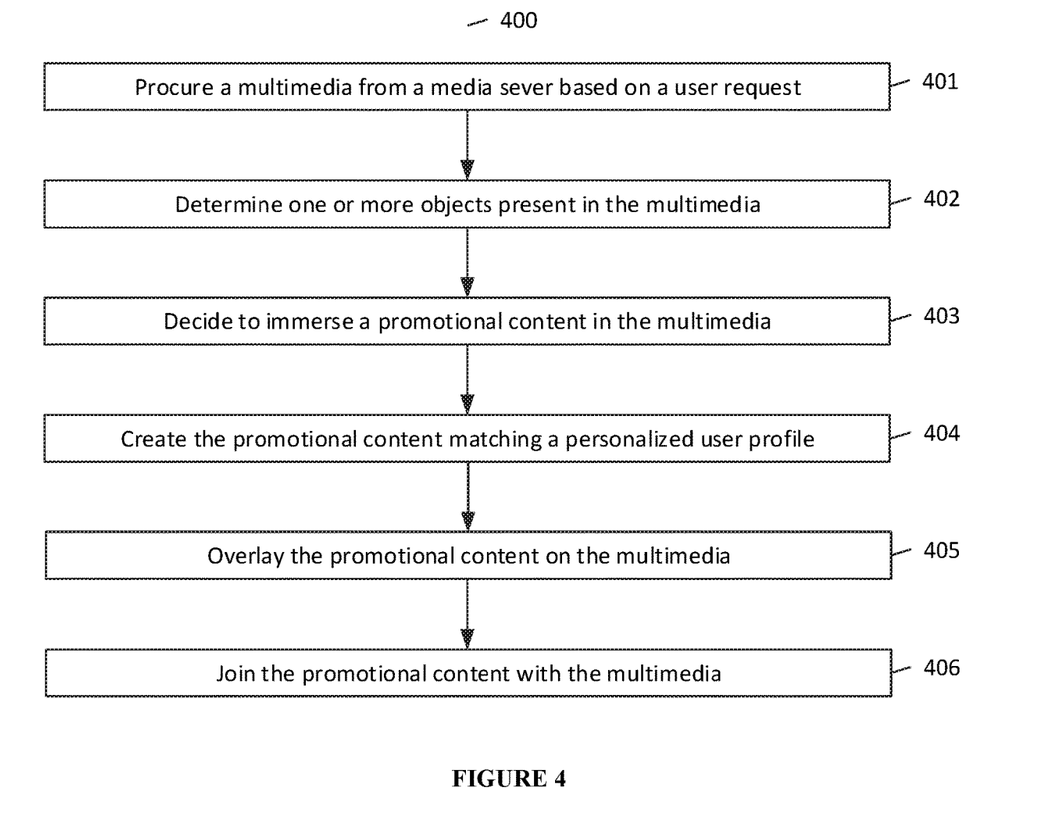
FIG. 4 shows a flowchart illustrating method of dynamically creating and inserting immersive promotional content in a multimedia in accordance with some embodiments of the present disclosure.

FIG. 4 shows a flowchart illustrating method of dynamically creating and inserting immersive promotional content in a multimedia in accordance with some embodiments of the present disclosure.

The order in which the method 400 may be described is not intended to be construed as a limitation, and any number of the described method blocks may be combined in any order to implement the method. Additionally, individual blocks may be deleted from the methods without departing from the spirit and scope of the subject matter described herein. Furthermore, the method may be implemented in any suitable hardware, software, firmware, or combination thereof.

At the step 401, the method may include retrieving, by the content management server (104), the multimedia requested by the user. The multimedia may be one of live or non-live video assets. The multimedia may consist of video from multiple cameras for example a 360-degree video. Therefore, the multimedia may be retrieved based on the user viewing direction. The viewing direction information of the video along with pitch and yaw configuration may be received from the video player (102) may be configured on the user device (101).

At the step 402, the method may include determining, by the content management server (104), one or more objects present in the multimedia may be by extracting the meta data of the multimedia. An Artificial Intelligence (AI) based single shot multi-box detector may be used to identify metadata in the video using a single deep neural network. The metadata thus extracted may include information about the one or more objects in the multimedia, co-ordinates and position of the one or more objects, metadata taxonomy, and Z-plane depth calculation.

The promotional content may be immersed contextually in the multimedia and also may capture the 3D information of the multimedia and decide on at least one object to immersing the promotional content for 360-degree video.

At the step 403, the method may include classifying, by the content management server (104), the content present in the multimedia may be classified as appropriate or inappropriate based on the type of the content. A decision to immerse the promotional content on at least one object from the one or more objects in the multimedia may be done based on the classification of the content present in the multimedia. A Machine learning based classifier with the help of extracted metadata at the step 402 may be used to identify the type of content present in the multimedia. The classifier uses data models to calculate the probability of the content falling into an inappropriate category by using various content classifiers for example political classifier, Religious classifier and Adult Classifier.

The content in the multimedia may be analyzed and the moderation level may be identified. Further, based on the moderation level a decision may be made to immerse the promotional content.

At the step 404, method may include creating a promotional content matching the personalized user profile by the content management server (104). Before creating the promotional content, at least one object from the one or more object may be selected to immerse the promotional content. An edge detecting algorithm may be used to identify edges of the at least one object and the content management server (104) may obtain a best matching model to overlay the promotional content by optimizing over the object-model pair. The best matching model provides the details regarding the object segmentation and the chordiogram distance of the object in the multimedia. The content management server (104) may procure a list of brand object assets from the asset database (106) and may select a best matching object asset based on the personalized user profile. Further, the content management server (104) may retrieve the corresponding 2D or 3D object from Object Asset database (106) and paints the 2D or 3D model with the color of brand and other attributes required by the brand. The size and shape of the object asset may be matched to the at least one object to be morphed and a set of pre-defined animation may be chosen to be performed by the 2D or 3D object asset.

The promotional content may be created in the real time matching the user personalized profile.

In an embodiment, the content management server (104) schedules immersion of the promotional content in the multimedia based on a rule. The timing of the promotional content may be based on user defined rules. For example If the screen orientation of the user device (101) has not changed for 3 or more seconds, then showcase the promotional content.

If user continues to hold the current screen position, then showcase more promotional content from the same brand.

If user comes back to same direction in case of a 360-degree video, then showcase the promotional content.

At the step 405, the method may include overlaying, by the content management server (104), the created promotional content on the at least object in the multimedia. The content management server (104) may use a convoluted neural network to shape, blend, composite and mask the promotional content object asset. The promotional content object asset may be adjusted to match the size and coordinates of at least one object. Further, an object recognition of the at least one object and a motion timing may be used to match the promotional content object asset to the at least one object. The size and coordinates of the at least one object may be extracted through edge detection algorithms. Further, the promotional content object asset may be modified using shrinking, rotating and flipping operations to best match the coordinates of the at least one object in the multimedia. The direction of the at least one object may be determined through the one or more measurements generated by a neural network. Further, the promotional content may be placed on the multimedia and a mask may be inserted on the promotional content object asset to match the contrast of the at least one object.

The promotional content may be placed after identifying the viewing direction of the user for a 360-degree video and the direction of the at least one object presents in the multimedia.

In an embodiment, the content management server (104) may determine the size of promotional content and the multimedia. If the size of the promotional content and the multimedia needs an additional bandwidth as compared with the existing bandwidth then the video player (102) requests an upgrade in the bandwidth to the service provider to deliver a seamless user experience. The content management server (104) through the video player (102) may send a request to Policy and Charging Enforcement Function (PCEF) that may be linked to a Policy and Charging Rules Function (PCRF) for additional bandwidth to deliver the multimedia with immersed promotional content. Further, if the additional requested bandwidth is not provisioned then the promotional content may be skipped and not displayed.

The promotional content embedded into multimedia may be streamed after requesting an additional bandwidth upon identifying insufficient bandwidth for streaming the composite multimedia.

At the step 406, the method may include joining, by the content management server (104), the promotional content and the multimedia resulting to obtain a composite multimedia. The content management server (104) may use markers or join points in a multimedia stream to signal the start or end of the promotional content to be immersed in the multimedia. Further, an overlay filter may be used to etch the promotional content in the multimedia. The origin of the promotional content may accurately splice the multimedia at the exact timestamp signaled by the cue.

Figure 5:
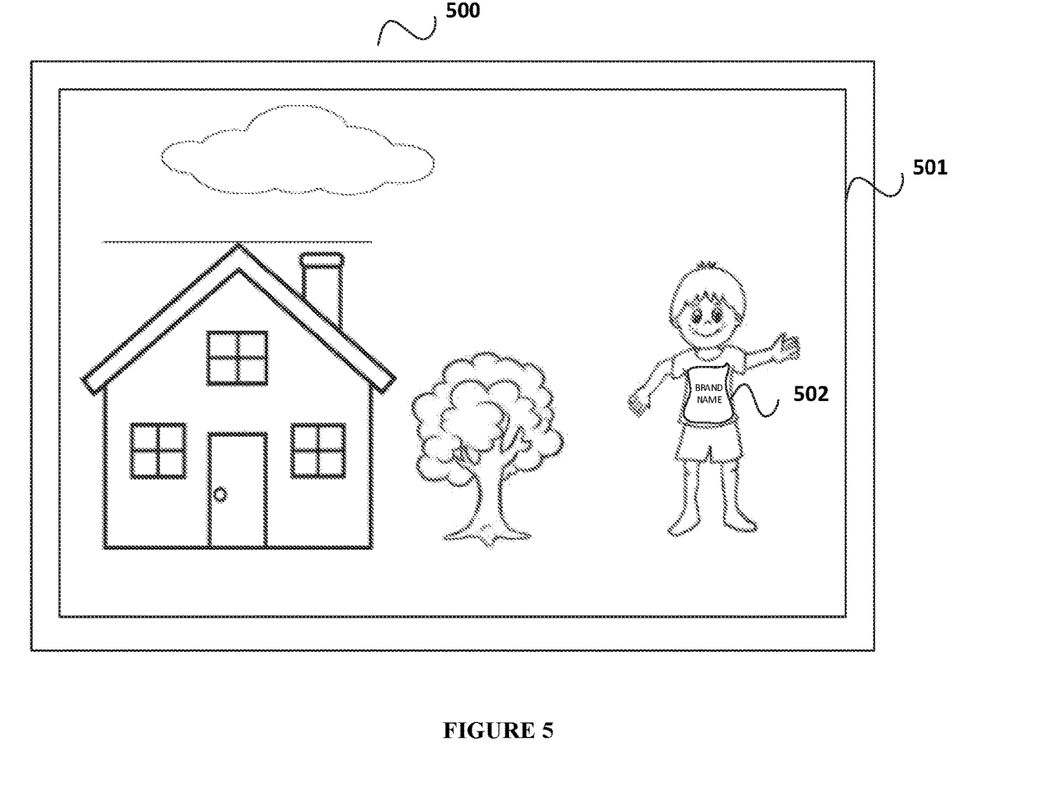
FIG. 5 shows an exemplary multimedia immersed with a promotional content in accordance with some embodiments of the present disclosure.

FIG. 5 shows an exemplary multimedia immersed with a promotional content in accordance with some embodiments of the present disclosure.

As shown in FIG. 5 a user device (101) may be streaming an exemplary composite multimedia (501). The composite multimedia (501) includes of a multimedia procured form a media server (105) and an immersed promotional content (502). Initially the content management server (104) procures the requested multimedia form the media server (105) and determines one or more objects present in the multimedia based on the extracted metadata information. The determined objects for the composite multimedia (501) may include "house", "tree", "cloud", "boy". The content management server (104) moderates the content in the multimedia and decides to immerse the promotional content (502). One object from the one or more identified objects may be chosen to overlay the promotional content. Further, the promotional content (502) may be created in real time from the asset database (106) matching the personalized user profile data (205) and immersed on the "t-shirt" of the determined object "boy".

Computer System

Figure 6:
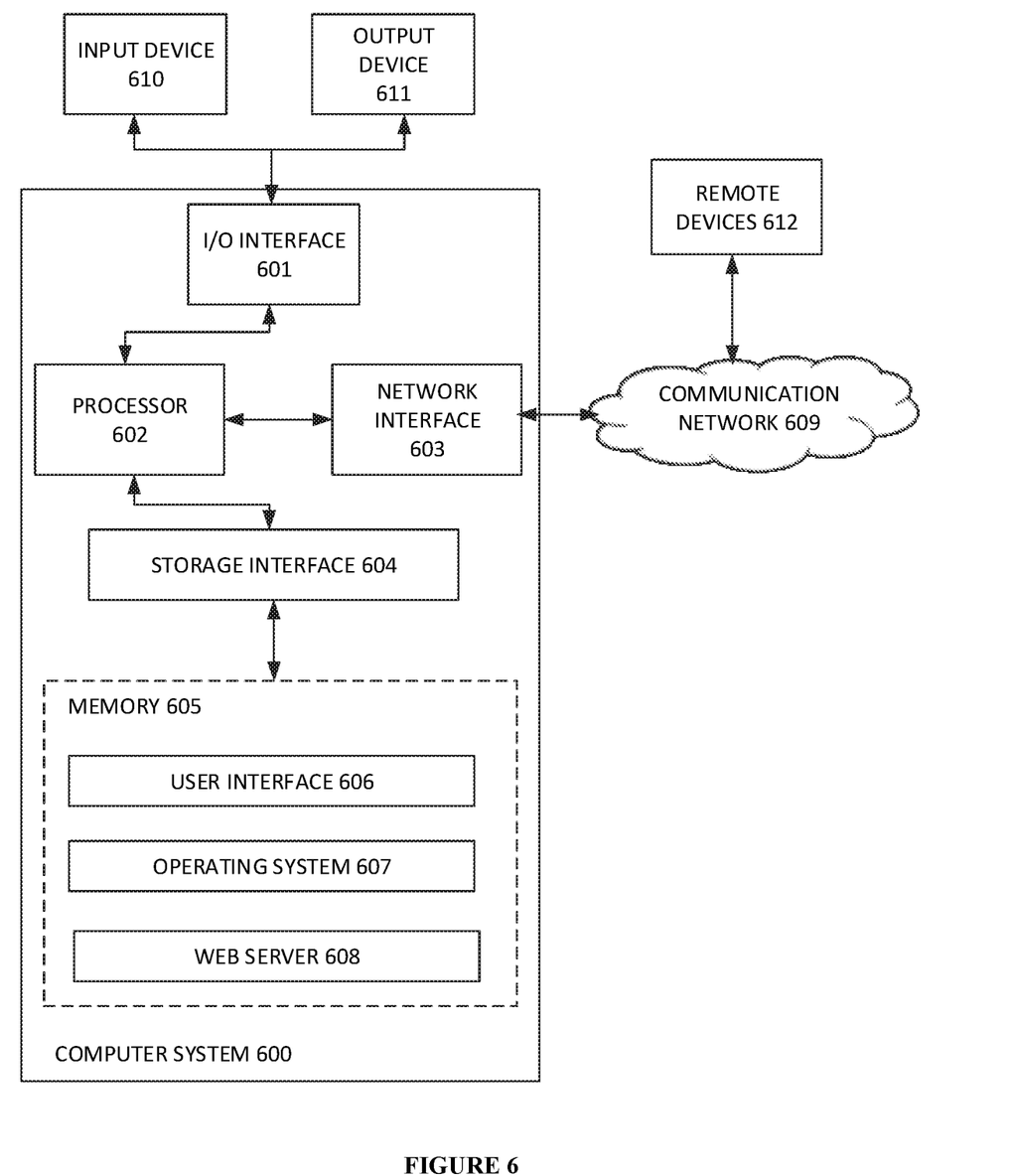
FIG. 6 shows a general-purpose computer system to identify the objectionable content present in a multimedia content before upload in accordance with embodiments of the present disclosure.

FIG. 6 illustrates a block diagram of an exemplary computer system (600) for implementing embodiments consistent with the present disclosure. In an embodiment, the computer system (600) may be used to implement the method for dynamically creating and inserting a promotional content in a multimedia. The computer system (600) may comprise a central processing unit ("CPU" or "processor") (602). The processor (602) may comprise at least one data processor for executing program components for dynamic resource allocation at run time. The processor (602) may include specialized processing units such as integrated system (bus) controllers, memory management control units, floating point units, graphics processing units, digital signal processing units, etc.

The processor (602) may be disposed in communication with one or more input/output (I/O) devices (not shown) via I/O interface (601). The I/O interface (601) may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface (601), the computer system (600) may communicate with one or more I/O devices. For example, the input device (610) may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device (611) may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system (600) is connected to the service operator through a communication network (609). The processor (602) may be disposed in communication with the communication network (609) via a network interface (603). The network interface (603) may communicate with the communication network (609). The network interface (603) may employ connection protocols including, without limitation, direct connect, Ethernet (e.g., twisted pair 10/100/1000 Base T), transmission control protocol/Internet protocol (TCP/IP), token ring, IEEE 802.11a/b/g/n/x, etc. The communication network (609) may include, without limitation, a direct interconnection, e-commerce network, a peer to peer (P2P) network, local area network (LAN), wide area network (WAN), wireless network (e.g., using Wireless Application Protocol), the Internet, Wi-Fi, etc. Using the network interface (603) and the communication network (609), the computer system (600) may communicate with the one or more service operators.

In some embodiments, the processor (602) may be disposed in communication with a memory (605) (e.g., RAM, ROM, etc. not shown in FIG. 6 via a storage interface (604). The storage interface (604) may connect to memory (605) including, without limitation, memory drives, removable disc drives, etc., employing connection protocols such as serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory (605) may store a collection of program or database components, including, without limitation, user interface (606), an operating system (607), web server (608) etc. In some embodiments, computer system (600) may store user/application data (606), such as the data, variables, records, etc. as described in this disclosure. Such databases may be implemented as fault-tolerant, relational, scalable, secure databases such as Oracle or Sybase.

The operating system (607) may facilitate resource management and operation of the computer system (600). Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA®/7/8, 10 etc.), APPLE® IOS®, GOOGLE™ ANDROID™, BLACKBERRY® OS, or the like.

In some embodiments, the computer system (600) may implement a web browser (608) stored program component. The web browser (608) may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers (608) may utilize facilities such as AJAX, DHTML, ADOBE® FLASH®, JAVASCRIPT®, JAVA®, Application Programming Interfaces (APIs), etc. In some embodiments, the computer system (600) may implement a mail server stored program component. The mail server may be an Internet mail server such as Microsoft Exchange, or the like. The mail server may utilize facilities such as Active Server Pages (ASP), ACTIVEX®, ANSI® C++/C#, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® Exchange, Post Office Protocol (POP), Simple Mail Transfer Protocol (SMTP), or the like. In some embodiments, the computer system (600) may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

In an embodiment, the computer system (600) may comprise remote devices (612). The computer system (600) may receive the multimedia content with the promotional content from the remote devices (612) through the Communication network (609).

The terms "an embodiment", "embodiment", "embodiments", "the embodiment", "the embodiments", "one or more embodiments", "some embodiments", and "one embodiment" mean "one or more (but not all) embodiments of the invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise. The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the invention.

When a single device or article is described herein, it may be readily apparent that more than one device/article (whether or not they cooperate) may be used in place of a single device/article. Similarly, where more than one device or article is described herein (whether or not they cooperate), it may be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The illustrated operations of FIG. 4 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Thus, the dynamic creation and insertion of the promotional content in the multimedia ensures displaying the promotional content in a non-obstructive manner and enhance the user experience. The promotional content or the promotional content is created in real time matching the user persona. The promotional content is created by choosing a 2D or a 3D model of a brand from the asset database (106), colored, blended, masked, composited and overlaid on at least one object selected from the multimedia. The promotional content may be inserted into the multimedia after identifying the moderation of the content present in the multimedia. The promotional content may be placed only in the viewing direction of the user for 360-degree videos. The promotional content embedded into the multimedia may be streamed by requesting an additional bandwidth upon identification of insufficient bandwidth.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the disclosure of the embodiments of the invention is intended to be illustrative, but not limiting, of the scope of the invention, which is set forth in the following claims.

While various aspects and embodiments have been disclosed herein, other aspects and embodiments may be apparent to those skilled in the art. The various aspects and embodiments disclosed herein are for purposes of illustration and are not intended to be limiting, with the true scope and spirit being indicated by the following claims.

What is claimed is:

1. A method for dynamically creating and inserting immersive promotional content in a multimedia, wherein the method comprising:
   procuring, by a content management server, the multimedia from a media server based on a user request to stream the multimedia to a user device, wherein the multimedia comprises a 360-degree video;
   determining, by the content management server, one or more objects present in the multimedia;
   classifying, by the content management server, a content present in the multimedia to decide immersion of the promotional content on at least one object from the one or more objects;
   creating, in real time, by the content management server, the promotional content matching a personalized user profile based on a decision of immersing the promotional content onto the at least one object, wherein the personalized user profile comprises a viewing direction of a user;

overlaying, by the content management server, the promotional content onto the at least one object, wherein overlaying the promotional content comprises placing the promotional content based on the viewing direction of the user and a direction of the at least one object; and
joining, by the content management server, the promotional content with the multimedia to obtain composite multimedia, wherein the composite multimedia is streamed to the user device.

2. The method of claim 1, wherein the determining the one or more objects present in the multimedia comprises:
extracting metadata of the multimedia using Artificial Intelligence (AI) based metadata extractor; and
identifying the one or more objects present in the multimedia based on the metadata, wherein the identified one or more objects present in the multimedia is stored in a repository.

3. The method of claim 1, wherein the content present in the multimedia is classified based on the metadata of the multimedia and the content of the multimedia, using an artificial intelligence (AI) based classifier into at least one of an appropriate content or an inappropriate content to the user.

4. The method of claim 1, wherein the personalized user profile is received by the content management server from the user device in real time or retrieved from a user profile database associated with the content management server.

5. The method of claim 4, wherein the personalized user profile further comprises at least one of a location of the user, a position of multimedia content on a screen of the user device, a user facial and demographic information, viewing angle on a video player configured in the user device, orientation of the screen, a preferred pitch setting of the multimedia, a preferred roll setting of the multimedia, and a preferred yaw setting of the multimedia.

6. The method of claim 1, wherein creating the promotional content based on the personalized user profile comprises:
choosing a promotional content object asset matching the personalized user profile from a database containing promotional content assets; and
modifying the promotional content object asset to match a size and a shape of the at least one object in the multimedia and create an animation for the promotional content object asset.

7. The method of claim 1, wherein the created promotional content is scheduled to overlay on the at least one object by determining duration of the promotional content, a timing interval to immerse the promotional content on the multimedia, and a specified animation or transition effect of the promotional content, further wherein the promotional content is immersed on the at least one object positioned at predefined location in a 360-degree video plane of the multimedia.

8. The method of claim 1, wherein streaming the composite multimedia to the user device comprises requesting an additional bandwidth to a Policy and Charging Enforcement Function (PCEF) linked to at least one of a Policy and Charging Rules Function (PCRF), and an Online Charging System (OCS) through video player configured in the user device, upon detection of insufficient bandwidth for streaming the composite multimedia to the user device.

9. The method of claim 6, wherein overlaying the promotional content further comprises:
matching the promotional content object asset to the size of the at least one object in a 3D plane, matching the promotional content object asset to coordinates of the at least one object by performing at least one of shrink operations, rotate operations, flip operations, an edge detection, an object recognition, a motion timing, blending, or compositing; and
inserting a mask to match a contrast of the promotional content object asset with the at least one object.

10. A content management server, for dynamically creating and inserting immersive promotional content in a multimedia, comprising:
a processor; and
a memory communicatively coupled to the processor, wherein the memory stores processor instructions, which, on execution, causes the processor to:
procure the multimedia from a media server based on a user request to stream the multimedia to a user device, wherein the multimedia comprises a 360-degree video;
determine one or more objects present in the multimedia;
classify content present in the multimedia to decide immersion of the promotional content on at least one object from the one or more objects;
create the promotional content in real time, matching a personalized user profile based on a decision of immersing the promotional content onto the at least one object, wherein the personalized user profile comprises a viewing direction of a user;
overlay the promotional content onto the at least one object, wherein overlaying the promotional content comprises placing the promotional content based on the viewing direction of the user and a direction of the at least one object; and
join the promotional content with the multimedia to obtain composite multimedia, wherein the composite multimedia is streamed to the user device.

11. The content management server of claim 10, wherein the processor is configured to determine the one or more objects present in the multimedia comprises:
extracting metadata of the multimedia using Artificial Intelligence (AI) based metadata extractor; and
identifying the one or more objects present in the multimedia based on the metadata, wherein the identified one or more objects present in the multimedia is stored in a repository.

12. The content management server of claim 11, wherein the processor is configured to classify the content present in the multimedia based on the metadata of the multimedia and the content of the multimedia, using an artificial intelligence (AI) based classifier into at least one of an appropriate content or an inappropriate content to the user.

13. The content management server of claim 10, wherein the processor is configured to receive the personalized user profile from the user device in real time or to retrieve from a user profile database associated with the content management server.

14. The content management server of claim 13, wherein the personalized user profile further comprises at least one of a location of the user, a position of multimedia content on a screen of the user device, a user facial and demographic information, viewing angle on a video player configured in the user device, orientation of the screen, a preferred pitch setting of the multimedia, a preferred roll setting of the multimedia, and a preferred yaw setting of the multimedia.

15. The content management server of claim 10, wherein the processor is configured to create the promotional content based on the personalized user profile by performing:

choosing a promotional content object asset matching the personalized user profile from a database containing promotional content assets; and modifying the promotional content object asset to match a size and a shape of the at least one object in the multimedia and create an animation for the promotional content object asset.

16. The content management server of claim 10, wherein the processor is configured to schedule the created promotional content to overlay on the at least one object by determining duration of the promotional content, a timing interval to immerse the promotional content on the multimedia, and a specified animation or transition effect of the promotional content, further wherein the promotional content is immersed on the at least one object positioned at predefined location in a 360-degree video plane of the multimedia.

17. The content management server of claim 10, wherein the processor is configured to stream the composite multimedia to the user device by requesting an additional bandwidth to a Policy and Charging Enforcement Function (PCEF) linked to at least one of a Policy and Charging Rules Function (PCRF), and an Online Charging System (OCS) through video player configured in the user device, upon detection of insufficient bandwidth for streaming the composite multimedia to the user device.

18. The content management server of claim 15, wherein the processor is configured to overlay the promotional content by:

matching the promotional content object asset to the size of the at least one object in a 3D plane, matching the promotional content object asset to coordinates of the at least one object by performing at least one of shrink operations, rotate operations, flip operations, an edge detection, an object recognition, a motion timing, blending, or compositing; and inserting a mask to match a contrast of the promotional content object asset with the at least one object.

19. The content management server of claim 10, wherein the processor is configured in at least one of a Multi-Access Edge Computing (MEC) network, a cloud network, a remote server, and a 3D platform.

20. A non-transitory computer readable medium comprising instructions stored thereon for dynamically creating and inserting immersive promotional content in a multimedia that when processed by at least one processor cause a device to perform operations comprising:

procuring the multimedia from a media server based on a user request to stream the multimedia to a user device, wherein the multimedia comprises a 360-degree video;

determining one or more objects present in the multimedia;

classifying content present in the multimedia to decide immersion of the promotional content on at least one object from the one or more objects;

creating, in real time, the promotional content matching a personalized user profile based on a decision of immersing the promotional content onto the at least one object, wherein the personalized user profile comprises a viewing direction of a user;

overlaying the promotional content onto the at least one object, wherein overlaying the promotional content comprises placing the promotional content based on the viewing direction of the user and a direction of the at least one object; and joining the promotional content with the multimedia to obtain composite multimedia, wherein the composite multimedia is streamed to the user device.

\* \* \* \* \*